United States Patent [19]

Furcsik et al.

[11] Patent Number: 4,981,709

[45] Date of Patent: Jan. 1, 1991

[54] METHOD FOR MAKING A REDUCED FAT FOODSTUFF

[75] Inventors: Susan L. Furcsik, Lake Station, Ind.; David J. Mauro, Dolton, Ill.; Edward DeBoer, Sauk Village, Ill.; Kenneth Yahl, Orland Park, Ill.; Gregory Delgado, East Chicago, Ind.

[73] Assignee: American Maize-Products Company, Hammond, Ind.

[21] Appl. No.: 382,244

[22] Filed: Jul. 19, 1989

[51] Int. Cl.$^5$ .......................... A23L 1/09; A23L 1/29; A23L 1/307

[52] U.S. Cl. .................................... 426/565; 426/570; 426/589; 426/572; 426/659; 426/804; 426/613; 426/602; 426/658

[58] Field of Search ............... 426/570, 578, 565, 579, 426/589, 613, 659, 658, 589, 602, 661, 804; 127/23, 32, 33, 69, 71; 536/111

[56] References Cited

U.S. PATENT DOCUMENTS

| | | | |
|---|---|---|---|
| 3,369,910 | 2/1968 | Ganz et al. | 426/578 |
| 3,769,027 | 10/1973 | Mangiere et al. | 426/658 |
| 3,904,601 | 9/1975 | Tessler et al. | 426/578 |
| 3,962,465 | 6/1976 | Richter et al. | 426/658 |
| 3,986,890 | 12/1976 | Richter et al. | 127/38 |
| 4,308,294 | 12/1981 | Riapoli et al. | 426/567 |
| 4,415,599 | 11/1983 | Bos | 426/661 |
| 4,452,978 | 6/1984 | Eastman | 426/578 |
| 4,510,166 | 4/1985 | Lenchin | 426/565 |
| 4,536,408 | 8/1985 | Morehouse et al. | 426/804 |
| 4,562,086 | 12/1985 | Smolka et al. | 426/578 |

OTHER PUBLICATIONS

Modified Starches: Properties and Uses-O. B. Wurzburg, M. S.-Chapter 6-Hydroxypropylated Starches-J. V. Tuschoff-pp. 89-95.

Die Starke 23, Jahrg, 1971/Nr. 2-A Simplified Colorimetric Method for Determination of Amylose Content in Rice-C. M. Sowbhagya et al.-pp. 53-56.

Primary Examiner—Jeanette Hunter
Attorney, Agent, or Firm—Lucas & Just

[57] ABSTRACT

The method for making a reduced fat foodstuff entails replacing at least a portion of the fat and/or oil in the foodstuff with an aqueous dispersion of a hydroxypropylated starch having a degree of substitution of above 0.04 and an apparent amylose content of about 40%. A high amylose corn starch is the preferred starch base. a paste made from the dispersion is translucent and tends not to retrograde.

19 Claims, No Drawings

METHOD FOR MAKING A REDUCED FAT FOODSTUFF

This invention relates to foodstuffs and more particularly to a method for making a reduced fat foodstuff by replacing a portion of the fats and/or oils in the foodstuff with a hydroxypropylated high amylose starch.

Consumer awareness of the caloric content of foods has increased dramatically over the past few years and has brought about a demand for foods with reduced fat content. This demand has created a need in the food industry to replace at least a portion of the fat and/or oil in prepared foodstuffs with a component that does not detract from the taste, appearance, smell and mouthfeel of the foodstuffs and which has reduced caloric content.

It has been suggested that certain starch hydrolysates may be used as fat and/or oil replacers in foods, see U.S. Pat. No. 4,510,166 issued Apr. 9, 1985; U.S. Pat. No. 3,962,465 issued Jun. 8, 1976; U.S. Pat. No. 3,986,890 issued Oct. 19, 1976; and U.S. Pat. No. 4,536,408 issued Aug. 20, 1985.

The '166 patent teaches using starch hydrolysate having a DE less than 5 as a fat and/or oil replacer. A problem with starch hydrolysates having a DE below 5 is that they have poor taste and impart an undesirable starchy or roasted taste to the foodstuff. Additionally, it has been found that less than 5 DE starch hydrolysates produce pastes that are opaque and have a gray or tan color. In some food formulations, it is desirable that the fat and/or oil replacer form a translucent paste that is thick and smooth.

The '485 and '890 patents teach starch hydrolysates having DE's between 5 and 25 as fat and/or oil replacers. The process taught for making these 5 to 25 DE starch hydrolysates is extremely long and tedious and may not be acceptable for large commercial operations.

The '408 patent teaches using a non-gelling starch hydrolysate having a DE between about 4 to not more than 25.

Generally, it is important that a prepared food have a shelf life that allows it to move from the manufacturer to the consumer's table. In order to have a good shelf life, it is important that the prepared food remain stable. A problem with conventional starch based fat replacers is they tend to retrograde over a period of time.

It has now been discovered that a reduced fat foodstuff can be made by replacing at least a portion of the fat and/or oil in the foodstuff with an aqueous dispersion comprising water and an effective amount of a hydroxypropylated high amylose starch wherein the starch has an apparent amylose content of greater than 40% and a degree of substitution of the hydroxypropyl group for the hydroxyl group on the starch of at least about 0.04. The paste formed by cooking the aqueous dispersion of the hydroxypropylated high amylose starch is translucent with a thick, smooth consistency and has little or no starchy or roasted smell or taste. It has also been found that such a paste of the hydroxypropylated high amylose starch has good freeze-thaw stability. It has further been found that the paste of the hydroxypropylated high amylose starch is stable over long periods of time, tending not to retrograde.

The aqueous dispersion contains an effective amount of the granular form of hydroxypropylated high amylose starch and preferably contains between about 2 to about 25%, and more preferably about 5 to about 15% by weight solids. If the foodstuff has water in its formulation, then the granular form of hydroxypropylated high amylose starch can be added directly to the foodstuff and the aqueous dispersion will form in the foodstuff itself.

The aqueous dispersion is formed by mixing the granular form of the hydroxypropylated high amylose starch with water. The paste is formed by cooking the aqueous dispersion. Cooking entails raising the temperature of the dispersion to above the gelatinization temperature of the starch and holding it there while subjecting the dispersion to stirring until a translucent, thick, smooth paste is formed. Preferably the temperature is above about 190° F. (88° C.) and more preferably about 195° F. (91° C.). Preferably, the dispersion is held above the gelatinization temperature for at least three minutes and more preferably for about five minutes. Stirring is done in a conventional manner such as by an impeller. It is preferred to use the paste form of the aqueous dispersion in the foodstuff made in accordance with the present invention.

Starch obtained from corn, potato, wheat, rice, sago, tapioca, or sorghum are acceptable base starches so long as they have an apparent amylose content greater than about 40%. Suitable sources for such high amylose starch include high amylose corn starch and high amylose barley starch. Preferably, high amylose corn starch is used. The apparent amylose content must be above about 40% and more preferably about 50% and above. Good results have been obtained with a corn starch having an apparent amylose content of about 50 to about 65%. Such a high amylose corn starch is available from American Maize-Products Company under the trademark Amaizo ®5.

The term "amylose content" or "apparent amylose content" of the starch as used in the specification and claims means the amylose content of the starch prior to hydroxypropylation as determined by conventional spectrophotometric iodine absorption.

The degree of substitution of hydroxypropylated starch must be at least about 0.04 and more preferably about 0.05 to about 0.3. Good results have been obtained with a hydroxypropylated starch having a degree of substitution of about 0.08 to about 0.2.

The term "degree of substitution" as used in the specification and claims means the number of hydroxypropyl radicals, $-CH_2CH(OH)CH_3$, per anhydroglucose unit in the starch polymer. The degree of substitution is determined in a conventional manner (C-30, revision 11-9-73 Standard Analytic Methods CRA Manual).

The hydroxypropylated high amylose starch of the present invention forms translucent pastes which remain translucent over long periods of time. The stability of the paste demonstrates the ability of the present invention not to retrograde. The translucent pastes of the present invention have a percent transmitance greater than zero at about 7.5% solids after stored at about 4° C. for a period of about 4 days. More specifically, the 7.5% solids pastes of the present invention have a percent transmittance above about zero and less than about 20. A transparency of zero is defined as opaque. A transparency above zero and below about 20 means the starch paste is translucent. The light transmittance is measured spectrophotometrically in a 2×4 centimeter cuvette.

The term "foodstuffs" as used in the specification and claims means foods that have been formulated from more than one component. Examples of such foodstuffs are spoonable and pourable salad dressings, frozen novelties, ice cream, whipping toppings, icings, and sauces.

Replacing the fat and/or oil in order to make a reduced fat foodstuff in accordance with the present invention is accomplished by replacing at least a portion of the fat and/or oil used in formulating the foodstuff with an aqueous dispersion comprising water and an effective amount of the hydroxypropylated high amylose starch of the present invention. Suitably, an aqueous dispersion of hydroxypropylated high amylose starch of the present invention is substituted for the fat and/or oil on about a 1 to 1 weight basis, i.e. about 1 gram of an aqueous dispersion of hydroxypropylated high amylose starch for about 1 gram of fat and/or oil.

Since the caloric content of fat and/or oil is about 9 calories per gram and the caloric content of an aqueous dispersion of hydroxypropylated high amylose starch of the present invention is about 1 calorie per gram, a caloric decrease of more than about 90% is obtained by replacing all of the fat and/or oil. Typically, formulated foodstuffs contain up to about 80% by weight fat and/or oil. Preferably, in any foodstuffs formulated with a fat and/or oil, up to about 50% by weight of the fat and/or oil is replaced with the aqueous dispersion of hydroxypropylated high amylose starch of the present invention and more preferably up to about 90% of the fat and/or oil is replaced.

A granular form of hydroxypropylated starch having a degree of substitution greater than about 0.04 and an apparent amylose content of greater than 40% is made in a conventional manner. The high amylose starch in granular form is slurried in water to a Baumé of about 17° to 22°, preferably about 19° Bé. To this slurry is added about 5 to 20% by weight sodium sulfate based on dry starch weight, preferably 10%, to protect the starch from swelling. The slurry and sodium sulfate is mixed for about 15 minutes. Then about 0.07 moles of sodium hydroxide per mole starch anhydroglucose unit is added to the slurry. Preferably, the sodium hydroxide is added as a 4% solution and preferably is added below the surface of the slurry. The slurry is then transferred to a reaction vessel equipped with a reflux condenser. Then about 4% to about 15% and preferably about 10% by weight based on dry starch weight of propylene oxide is added to the slurry over a period of about 30 minutes using gravity feed through a funnel where the end of the funnel tube is below the slurry surface while mixing the slurry. After about an additional 30 minutes of mixing the slurry at ambient temperature, the temperature of the slurry is raised to about 40° C. to about 50° C. and the slurry is held at that temperature for about 20 hours. Mixing is continued throughout the reaction. After about 20 hours the slurry is neutralized to a pH of about 5.5 to about 6.0 with dilute hydrochloric acid (HCl) or sulfuric acid ($H_2SO_4$). The slurry is then dewatered, preferably by centrifuge. Next, the product is washed by reslurrying the product to about 19° Bé and dewatering. The product is then dried in a conventional manner to about 12% moisture. Finally the product is milled through a 30 mesh screen.

The starch may be further processed after hydroxypropylation such as by hot rolling or jet cooking and spray drying.

These and other aspects of the present invention may be more fully understood by reference to the following examples.

EXAMPLE 1

This example illustrates making a pourable salad dressing in accordance with the present invention.

Three formulations of pourable salad dressing were prepared. Each product was found to have comparable taste, appearance and texture. Table I below illustrates these three formulations.

TABLE I

| Ingredient | Control | 50% Oil Replaced | 95% Oil Replaced |
| --- | --- | --- | --- |
| Water | 30.0 | 30.0 | 30.0 |
| Vinegar, 50 grain | 20.0 | 20.0 | 20.0 |
| Sugar | 12.75 | 12.75 | 12.75 |
| Salt | 1.50 | 1.50 | 1.50 |
| Xanthan | 0.75 | 0.75 | 0.75 |
| Oil | 35.0 | 17.50 | 1.75 |
| Fat Replacer | — | 17.50 | 33.25 |

The numbers in Table I are based on percent by weight of formulation. The oil used was conventional vegetable oil. The fat replacer was a paste made from a hydroxypropylated starch wherein the degree of substitution was 0.11 and the starch base used to make the hydroxypropylated starch was a high amylose corn starch sold by American Maize-Products Company under the trademark Amaizo ®5. Amaizo ®5 typically has an apparent amylose content of 60%. The paste was made by forming an aqueous dispersion at a solids content of 7.5% by weight, heating the dispersion to about 93° C. and holding the dispersion at that temperature for about 5 minutes while constantly stirring the dispersion. The paste was allowed to cool to room temperature.

Each of the salad dressing formulations was prepared by combining the water and vinegar and preblending all dry ingredients. Then the preblended dry ingredients were blended with the water and vinegar. Slowly and in an alternating manner the oil and the fat replacer paste was added to the mix. A smooth pre-emulsion was then formed and finally the mixture was homogenized.

EXAMPLE 2

This example illustrates making a frozen novelty in accordance with the present invention. Each formulation was found to be comparable in taste, appearance and mouthfeel. Table II below illustrates the two formulations.

TABLE II

| Ingredient | Control | 50% Fat Replaced |
| --- | --- | --- |
| Butter, unsweetened | 15.6 | 7.8 |
| Milk, 3.5% fat | 15.6 | 7.8 |
| Non-fat dried milk | 9.6 | 10.5 |
| Sugar | 12.0 | 12.0 |
| Corn syrup, 43/42 | 4.0 | 4.0 |
| Sea Kem GP 418 | 0.2 | 0.2 |
| Lodex 10 | — | 5.55 |
| Water | 43.0 | 46.15 |
| Fat replacer | — | 6.0 |

The numbers in Table II are based on percent by weight formulation. The fat replacer used in this formulation was the paste used in Example 1 above.

Both formulations were prepared by adding the preblended dry ingredients to the butter, milk, water and corn syrup. The mix was then pasteurized, homogenized, cooled to 4° C. and aged for 24 hours. The mix was then processed in an ice cream maker. The fat replacer paste was combined with the butter, milk, water and corn syrup initially.

EXAMPLE 3

This example indicates the stability and the translucent properties of a paste made in accordance with the present invention.

TABLE III

| wavelength | PRESENT INVENTION Paste A % Transmittance | PRIOR ART Paste B % Transmittance | PRIOR ART Paste C % Transmittance |
|---|---|---|---|
| 24 hrs. | | | |
| 450 μm | 0.2 | 0.4 | 0.0 |
| 600 μm | 0.4 | 3.6 | 0.0 |
| 48 hrs. | | | |
| 450 μm | 0.2 | 0.0 | 0.0 |
| 600 μm | 0.3 | 0.6 | 0.0 |
| 72 hrs. | | | |
| 450 μm | 0.2 | 0.0 | 0.0 |
| 600 μm | 0.3 | 0.2 | 0.0 |
| 96 hrs. | | | |
| 450 μm | 0.2 | 0.0 | 0.0 |
| 600 μm | 0.3 | 0.0 | 0.0 |

Each paste was made by combining a starch product with water to form an aqueous dispersion of 7.5% solids, heating the dispersion to about 95° C. and holding the dispersion at that temperature for about 5 minutes while constantly stirring the dispersion.

The three pastes were then put into 4 separate cuvettes, one for each 24 hour period. The cuvette measured 2 centimeters in diameter and 4 centimeters in length. The filled cuvettes were placed in cold storage, 4° C., for the period indicated in Table III above.

After 24 hours, one cuvette of each paste was removed from cold storage and allowed to stand at room temperature for about 1½ hours. This allowed the cuvette to equilibrate. The percent transmittance was measured with a Bausch and Lomb Spectronic 21 at both 450 μm and 600 μm. The results are listed in Table III above. Once the test was complete, the contents of the cuvettes were discarded.

Paste A was made from the hydroxypropylated high amylose starch of Example 1 above. Paste B was made from a commercially available starch product sold under the name PASELLI SA-2 by Avebe and allegedly made in accordance with U.S. Pat. No. 3,962,465. Paste C was made from another commercially available starch product sold under the name N-OIL by National Starch and Chemical Corporation and allegedly made in accordance with U.S. Pat. No. 4,510,166.

It is evident from the data of Table III that the paste made in accordance with the present invention remained translucent for 4 days while the other pastes became opaque.

Cold storage enhances retrogradation. From the above data, it is seen that the paste of the present invention remained stable and showed little or no signs of retrogradation. The paste made in accordance with the present invention was translucent throughout the four day storage at 4° C.

It will be understood that the claims are intended to cover all modifications and changes of the preferred embodiment of the invention herein chosen for illustration which do not constitute a departure from the spirit and scope of the invention.

What is claimed is:

1. A method for preparing a reduced fat foodstuff comprising the step of replacing at least a portion of the fat and/or oil in a fat and/or oil-containing foodstuff with an aqueous dispersion comprising water and an effective amount of noncross-linked, hydroxypropylated high amylose starch, said starch having an apparent amylose content greater than about 40% and a degree of substitution greater than about 0.04, said aqueous dispersion capable of forming a paste that is translucent.

2. The method of claim 1 wherein the starch has an apparent amylose content of about 60%.

3. The method of claim 1 wherein the hydroxypropylated high amylose starch is in a granular form.

4. The method of claim 1 wherein the aqueous dispersion is a paste.

5. The method of claim 1 wherein the aqueous dispersion has a solids content of about 2 to about 25% by weight.

6. The method of claim 1 wherein the foodstuff is selected from the group consisting of spoonable and pourable salad dressings, frozen novelties, ice cream, whipping toppings, icings and sauces.

7. The method of claim 1 wherein the starch is obtained from corn.

8. The method of claim 1 wherein up to about 50% of the fat and/or oil is replaced with the aqueous dispersion.

9. The method of claim 1 wherein said aqueous dispersion is capable of forming a paste that has a percent transmittance above about zero and less than about 20 when measured spectrophotometrically at 600 μm in a two centimeter cell after four days of storage at 4° C. when said paste has a solids content of about 7.5% by weight.

10. A method for preparing a reduced fat foodstuff comprising the following sequential steps:
   (a) forming a slurry of a high amylose corn starch;
   (b) mixing about 5 to 10% by weight dry starch sodium sulfate into said slurry;
   (c) adding about 1% by weight dry starch sodium hydroxide to said slurry;
   (d) reacting the slurry with about 10% by weight of starch (dry basis) propylene oxide at about 50° C. for about 20 hours to form a noncross-linked hydroxypropylated starch having a degree of substitution greater than 0.04; and
   (e) replacing up to about 50% of the fat and/or oil in a fat and/or oil-containing foodstuff with an aqueous dispersion comprising water and an effective amount of the hydroxypropylated starch.

11. The method of claim 10 wherein the aqueous dispersion is in the form of a paste with a solids content of about 2 to about 25% by weight.

12. A foodstuff made by the process of claim 1.

13. A foodstuff made by the process of claim 10.

14. The method of claim 1 wherein said noncross-linked, hydroxypropylated high amylose starch has been subject to a hot rolling process.

15. The method of claim 7 wherein said noncross-linked, hydroxypropylated high amylose starch has been subject to a hot rolling process.

16. The method of claim 10 further comprising the step of hot rolling the noncross-linked hydroxypropylated starch prior to step (e).

17. A foodstuff made by the process of claim 14.
18. A foodstuff made by the process of claim 15.
19. A foodstuff made by the process of claim 16.

* * * * *